April 6, 1954
F. LYIJYNEN ET AL
2,674,488
PREFORMED VEHICLE HEADLINER
Filed April 6, 1950
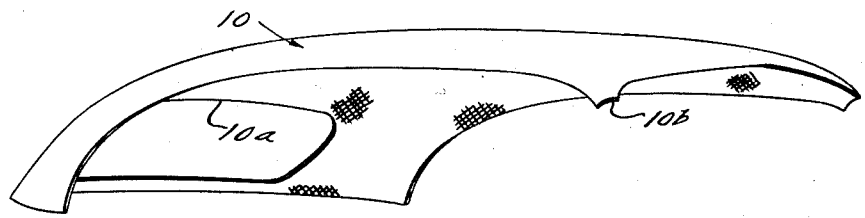
Fig. 1.
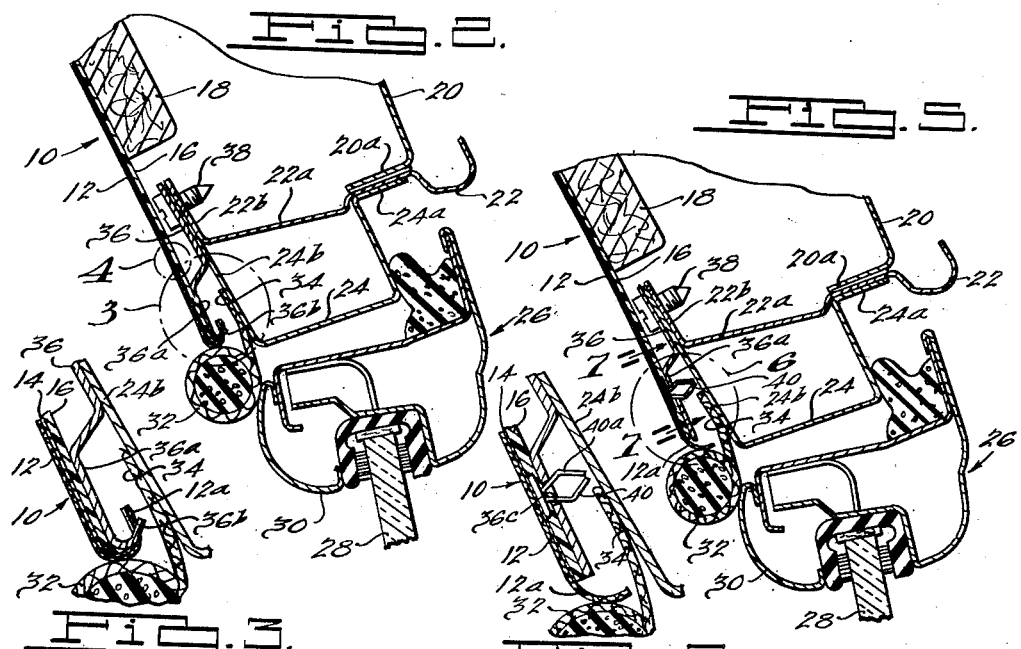
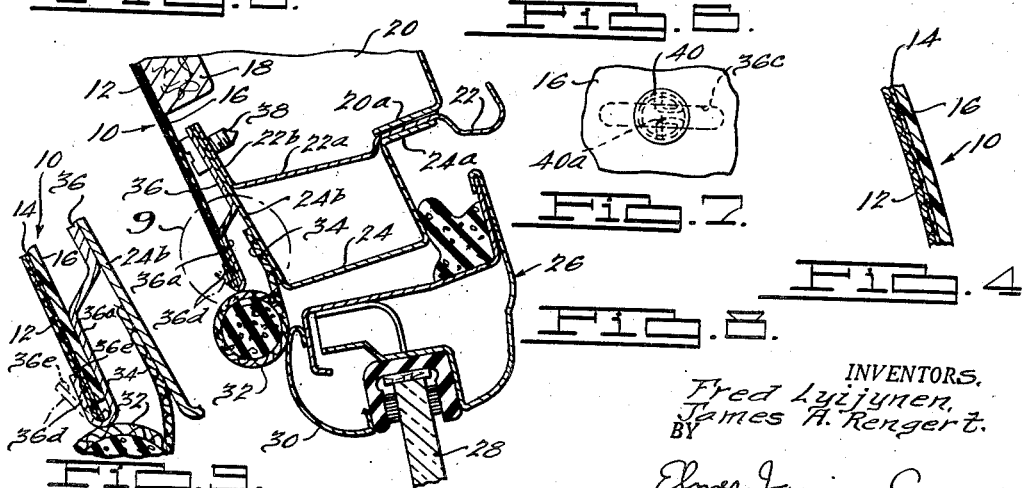
INVENTORS.
Fred Lyijynen,
James A. Rengert.
BY
Elmer Jamison Gray
ATTORNEY.

Patented Apr. 6, 1954

2,674,488

UNITED STATES PATENT OFFICE 2,674,488

PREFORMED VEHICLE HEADLINER

Fred Lyijynen and James A. Rengert, Detroit, Mich., assignors to Briggs Manufacturing Company, Detroit, Mich., a corporation of Michigan Application April 6, 1950, Serial No. 154,288

2 Claims. (Cl. 296—137)

This invention relates generally to headliners for vehicle bodies, such as automobile bodies, and in particular relates not only to improvements in headliners but also to a new and improved method of making and assembling the same within the vehicle body to cover and trim the underside of the roof thereof.

Heretofore it has been the practice in trimming the interiors of automobile bodies to apply a plastic sound deadening or damping material to the under surface of the metal roof panel and to cover the underside of the roof below the sound damping material with a cloth headliner which customarily stretches overhead from front to rear of the body. In order to support the headlining material it has been the usual practice to install a number of cross bows beneath the roof panel at suitably spaced intervals and to attach to these bows cloth strips or so-called listing to which the headliner is stitched. The several transverse rows of stitching by which the cloth headliner is held in place are plainly visible from within the automobile body. Moreover, since the headliner is only attached at spaced intervals at the localities of the supporting cross bows, it will sag between the rows of stitching, presenting an irregular, unattractive, and frequently unsightly appearance. With the above methods heretofore employed in attaching headlining material to the underside of the roof panel, it has been difficult and usually impossible to obtain a smooth and uniform appearance to the overhead trim within the body.

The said damping material which is customarily applied directly to the under surface of the metal roof panel is usually of plastic nature, such as an asphalt or bituminous composition. Frequently portions of this material become dislodged and drop down on the cloth headliner, producing unsightly stains and necessitating replacement of the headliner at great cost.

An important object of the present invention is to overcome the principal disadvantages heretofore encountered in the use of the above described headliners and to provide a headliner for the interior roof trim of an automobile body or other vehicle bodies in the form of a unitary self-sustaining panel which need only be attached in place along its edges and which is arched longitudinally and transversely so as to require no intermediate attaching means, thereby enhancing the appearance of the interior of the body by presenting a smooth uniform appearance and a clean sweep overhead from front to rear.

By providing an overhead trim of this nature within the body, the present invention possesses a number of important advantages. It eliminates the use of cross bows and the necessity of sewing a headlining cloth to sheeting or listing attached to the bows, thereby realizing large savings in production costs. It greatly improves the appearance of the interior of the body and eliminates spotting or staining of the headliner cloth by the said damping material applied above the cloth to the underside of the roof panel. Thus the invention simplifies body construction, reduces materially the cost of trimming the interior of the body, and provides an overhead finish trim which gives a new and more attractive appearance to the body.

A further object of the invention is to produce an automobile body headliner in the form of a panel made of laminations bonded together to provide a structure which will be sufficiently rigid and stiff to give self-sustaining characteristics to the panel, yet which will be bendable or adequately flexible to enable the panel to be bent and introduced into the body, such as through a door or the rear window opening thereof. Preferably the panel comprises a bottom lamination of headlining fabric and an upper layer of tough flexible plastic material of suitable thickness to give the needed shape and stiffness to the fabric, as well as the desired strength to withstand impact and tearing forces. The laminations are formed to a final shape longitudinally and transversely and become a self-sustaining unit which will not sag after installation, but will maintain its original shape after long use.

Still another object is to provide an improved headliner of the foregoing nature and simple improved inconspicuous means for quickly and easily securing the headliner along its edges in position within the vehicle body.

Other objects of this invention will appear in the following description and appended claims, reference being had to the accompanying drawings forming a part of this specification wherein like reference characters designate corresponding parts in the several views.

Fig. 1 is an isometric view from one side and below of an automobile body headliner embodying the present invention.

Fig. 2 is a fragmentary transverse vertical section through the roof sill or door header and upper portion of the door frame of a vehicle body, showing lower edge portions of the roof panel and a modification of the headliner, together with one means embodying the present invention for supporting and securing the headliner in position within the body.

Figs. 3 and 4 are fragmentary enlarged sections showing details of the structure within the circles 3 and 4 respectively of Fig. 2.

Fig. 5 is a fragmentary section similar to Fig. 2, showing a modification of the headliner support.

Fig. 6 is a fragmentary enlarged section showing details of the structure within the circle 6 of Fig. 5.

Fig. 7 is a fragmentary enlarged view taken in the direction of the arrows 7—7 of Fig. 6 along the inner surface of the resin layer near the lower edge of the headliner.

Fig. 8 is a fragmentary section similar to Fig. 2, illustrating another modification of the headliner support comprising a bendable channel support shown in the open position in phantom.

Fig. 9 is a fragmentary enlarged section showing details of the structure within the circle 9 of Fig. 8.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring particularly to Fig. 1, a self-sustaining automobile headliner 10 is shown comprising a preformed rigid yet flexible panel member arched transversely and longitudinally in its normal condition so as to fit within the automobile body and conform to the general interior contour of the roof panel. The headliner shown is dimensioned to comprise a complete interior liner for the roof panel, extending forward from the customary interior rear deck shelf, i. e. just below the usual rear window, to the upper edge of the windshield frame, and laterally to the roof sills or door openings. Thus the downward curved rear portion of the headliner 10 is provided with an opening 10a conforming to the dimensions of the rear window. Each forward lateral portion of the headliner terminates in a downward curved leg 10b positioned at the upper extremity of the front pillar at its region of merger with the roof panel proper.

The headliner 10 may comprise any suitable material having sufficient rigidity to sustain its form when supported solely along its edges, as described hereinafter, and sufficient flexibility and resiliency to facilitate installation. In this regard the headliner is preferably adapted to be flexed or bent temporarily from its preformed shape and inserted into the automobile body through an opening thereof, such as a door or window opening, and thereafter upon being released to return to its original preformed shape by virtue of its inherent resiliency, springing into position within the body to conform generally to the interior contour of the roof panel.

Preferably the headliner 10 will comprise a number of layers bonded together, as for example under the influence of heat and pressure through the medium of a bonding agent. Thus in a preferred construction an inner layer comprising an ornamental or decorative trim layer, such as a paper sheet colored or printed with a suitable design, or a layer of fabric, woven paper, or the like is coated at its outer surface with a tough flexible plastic backing layer, such as a thermosetting phenolic resin for example, or a stable cellulose-type, vinyl-type, or polyester-type thermoplastic, or the like, adapted to give the headliner the requisite form sustaining rigidity and the strength to withstand normally expected impact and tearing forces during use.

The backing layer may be applied to the trim layer either as a flat sheet, or by brushing or spraying with a varnish comprising the resin dissolved in a volatile solvent. Where the properties of the resin will cause bleeding through the trim layer, a protective prime or sealing coat such as latex or a sealing type resin will first be applied to the outer surface of the trim layer.

The arched form of the headliner may be readily produced by curing the assembled trim layer and a thermosetting resin on a die or form, or by post-forming the trim layer and a thermoplastic combination from flat sheets. After formation of the headliner, a thick flexible sound and thermal insulating layer or padding of cotton, paper matting, or the like may be cemented to the exterior of the backing prior to installation of the headliner in the automobile body. Thus, this insulating layer may be simply and economically applied while the headliner is readily accessible for fabricating operations exteriorily of the automobile body and may either supplant or augment the usual bituminous damping layer ordinarily applied directly to the interior of the roof panel to minimize rumbling.

One example of such a headliner 10 and a method of supporting and attaching the same within the automobile body is illustrated in Figs. 2, 3 and 4, wherein the headliner comprises a fabric inner trim layer 12, a sealer 14 such as the aforementioned latex layer bonded to the outer surface of the fabric layer 12, a form-sustaining resin layer 16 bonded to the outer surface of the latex layer 14, Fig. 4, and a thermal and sound insulating layer 18 cemented to the outer surface of the resin layer 16, Fig. 2.

A section through the door header of a typical automobile body construction is shown in Fig. 2, wherein the lower edge of a sheet metal roof panel 20 terminates laterally in an inturned flange 20a. A drip molding 22 having an interior extension 22a welded to the flange 20a terminates inwardly in an upturned flange 22b. An upward opening channel member 24 comprising the upper portion of the door jamb is provided at its outer channel wall with an outward flange 24a welded to the underside of the extension 22a to complete therewith and with the flange 20a a triple thickness header reinforcement. The inner channel wall 24b extends upward adjacent the inner surface of the flange 22b and is preferably welded thereto.

The door frame indicated generally by the numeral 26 is adapted to support the usual sliding glass 28 and is provided with the usual interior garnish molding 30 suitably secured to the body of the frame 26. The structure of the roof sill or door header and the door frame described thus far may be conventional and are accordingly not discussed in further detail.

Extending around the door opening within the body so as to overlie the gap between the upper door jamb portions of the frame 26 and the channel base of the jamb member 24 is the customary windlace 32 comprising a compressible core enclosed within a fabric cover. The latter is provided with a flexible fabric tab or extension 34 which is suitably secured to the interior face of the channel wall 24b by cement, fasteners or the like, so as to hold the body of the windlace 32 in position abutting the molding 30 upon closure of the door.

The headliner 10 is supported and retained in position within the body in the present instance by means of a retainer or a series of such members 36 secured to the welded together portions 22b, 24b by a plurality of screws 38. Each retainer 36 is formed with a downward directed flange 36a extending generally longitudinally of the vehicle body and offset inward from the adjacent channel side 24b, Fig. 3. The lower edge of the flange 36a substantially abuts the windlace 32 and terminates in a plurality of pointed longitudinally spaced teeth or barbs 36b which extend outward toward the body portion 24b and slightly upward.

As indicated in Fig. 2, the edges of the fabric, latex, and resin layers 12, 14, and 16 extend beyond the insulating layer 18 so as to lie adjacent the flange 36a when the headliner 10 is mounted in position within the body. In this position of the headliner, the edge of the layer 18 terminates somewhat above the upper edges of the body portions 22b, 24b, so as not to interfere therewith, and the edge of the resin layer 16 terminates adjacent the lower edge of the flange 36a. The fabric and latex layers 12 and 14 continue downward to comprise a flexible fabric attachment strip or tab 12a adapted to be drawn tightly around the lower edge of the flange 36a and hooked on the barbs or teeth 36b, thereby to retain and support the lower edges of the headliner 10 tightly against the flange 36a by means of the barbs 36b piercing said tab 12a.

The headliner 10 supported at its lower edges will retain its arched form by reason of its inherent rigidity and will comprise a complete liner for the interior roof portions of the body without recourse to other attachments therewith. The retainers may comprise a number of suitably shaped members adapted to extend end to end around the interior of the body to support the headliner along the entirety of its edges. However a discontinuous flange 36a supporting the headliner 10 along the principal extent of its edges will usually suffice, the intermediate edge portions of the headliner being concealed by a suitable trim molding, as for example by either of the modified supports discussed hereinafter.

The latex sealing layer 14 in addition to the resin layer 16 also serves as a shield for the fabric trim layer 12 to prevent spotting or staining thereof in the event of contact between the outer surface of the headliner and a bituminous coating applied to the interior of the roof panel 20. Accordingly, if desired, the crest or upper portions of the headliner may safely rest snugly against the roof panel 20, whether coated or not, so that the headliner will be positively engaged and supported in position by the interior of the roof panel from above and along the lower edges by the flange 36a and barbs 36b.

A modified support and concealment for the edges of the headliner 10 is shown in Figs. 5, 6, and 7, comprising the flange or flanges 36a provided with a plurality of longitudinally slotted apertures 36c spaced longitudinally and across the rear of the body and adapted to receive a corresponding plurality of spring clip fasteners 40, Fig. 6. The fasteners 40 may be conventional, each comprising in the present instance a pair of wire formed spring arms extending outward from the layer 16 and having base portions firmly embedded in the body of that layer. The spring arms of each pair diverge from each other transversely of the slots 36c to intermediate bend points 40a, Fig. 6, then converge and terminate adjacent each other at their outer ends, which may thus be pushed outward through any one of the apertures 36c. In this action, the spring arms 40 will be forced toward each other as the bend points 40a pass through the aperture 36c, whereupon the resiliency of the spring arms will cam the headliner edge portions snugly against the flange 36a. Similar to the structure illustrated in Figs. 2 and 3, the resin layer 18 terminates adjacent or in abutment with the windlace 32, permitting the marginal flap 12 to be tucked between the flange 36a and windlace 32 and frictionally retained in place.

Figs. 8 and 9 illustrate another support and concealment for the headliner edges, wherein the flange 36a terminates in an upturned bendable channel flange 36d. The flange 36d is spaced inward from the flange 36a to complete an upward opening channel adapted to receive the marginal edges of the headliner 10 therein, phantom position of Fig. 9, and is formed at its upper edge with a bead 36e confronting the flange 36a. Upon insertion of the lower headliner edge into the channel between the flanges 36a and 36d, the latter flange is bent tightly against the headliner edge, embedding the head 36e into the fabric layer 12 and positively securing the headliner within said channel, Fig. 9.

It is apparent from the foregoing that a novel and improved self-sustaining vehicle headliner construction has been disclosed whereby the headliner may be fabricated and preformed exteriorly of the vehicle body and thereafter flexed or bent and introduced into the body through a window or door opening thereof. The headliner is thus assembled in position to provide a complete self-sustaining lining for the interior roof portions of the vehicle, being conveniently supported solely at its edges. This construction facilitates the assembly and fabrication of headliners and at the same time provides a permanent durable stucture which will not sag or become discolored after long use, even in the event of inadvertent contact with the bituminous sound damping layer commonly coated on the interior of the roof panel. Likewise this construction presents a new and attractive headliner appearance having a smooth unbroken sweep from the front to rear and from side to side of the vehicle roof.

We claim:

1. In a vehicle body having a roof, a pre-formed headliner of flexible laminated sheet material having a shape dished transversely and longitudinally of the vehicle body, the sheet material of said headliner comprising an inner trim layer and an outer backing layer bonded to each other, the backing layer terminating downwardly in a depending marginal edge and having sufficient stiffness to retain the dished shape of the headliner when supported at said marginal edge independently of the body, said trim layer having a flap extending below said marginal edge of the backing layer, said body having a windlace supported adjacent a door opening, and means for securing the panel adjacent said edge to the body with said flap concealed between said marginal edge and windlace.

2. In a vehicle body having a roof, a pre-formed headliner of flexible laminated sheet material having a shape dished transversely and longitudinally of the vehicle body, the sheet material of said headliner comprising an inner trim layer and an outer backing layer bonded to each other, the backing layer terminating downwardly in a depending marginal edge and having sufficient stiffness to retain the dished shape of the headliner when supported at said marginal edge independently of the body, said trim layer having a flap extending below said marginal edge of the backing layer, and a metal retaining member secured to the body and having an upwardly and outwardly extending toothed edge upon which said flap of said trim layer is impaled.

References Cited in the file of this patent

UNITED STATES PATENTS

| Number | Name | Date |
|---|---|---|
| 1,506,845 | Ledwinka | Sept. 2, 1924 |
| 1,630,545 | Smith | May 31, 1927 |
| 1,720,315 | Bossemeyer | July 9, 1929 |
| 1,728,093 | Wintz | Sept. 10, 1929 |
| 2,008,655 | Clarvoe | July 16, 1933 |
| 2,083,030 | Mackay | June 8, 1937 |
| 2,099,649 | Hall | Nov. 16, 1937 |
| 2,118,563 | Mackay | May 24, 1938 |
| 2,207,958 | Tuell | July 16, 1940 |
| 2,239,318 | Haberstump | Apr. 22, 1941 |
| 2,428,591 | Slayter | Oct. 7, 1947 |
| 2,563,221 | Doty et al. | Aug. 7, 1951 |

FOREIGN PATENTS

| Number | Country | Date |
|---|---|---|
| 459,706 | Great Britain | Jan. 13, 1937 |
| 462,210 | Great Britain | Mar. 4, 1937 |